US007027269B2

(12) United States Patent
Penning et al.

(10) Patent No.: US 7,027,269 B2
(45) Date of Patent: Apr. 11, 2006

(54) METHOD OF MANUFACTURING A MAGNETIC HEAD HAVING A PLANAR COIL

(75) Inventors: Frank Cornelis Penning, Eindhoven (NL); Ronald Dekker, Eindhoven (NL); Henricus Godefridus Rafael Maas, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 579 days.

(21) Appl. No.: 09/923,611

(22) Filed: Aug. 7, 2001

(65) Prior Publication Data
US 2002/0031056 A1 Mar. 14, 2002

(30) Foreign Application Priority Data
Aug. 9, 2000 (EP) .................................. 00202818

(51) Int. Cl.
*G11B 5/127* (2006.01)
(52) U.S. Cl. ..................................................... 360/317
(58) Field of Classification Search ................ 369/300, 369/13.23, 13.12; 360/317, 318, 126; 372/46; 438/3; 29/603.13
See application file for complete search history.

(56) References Cited

U.S. PATENT DOCUMENTS 5,387,551 A * 2/1995 Mizoguchi et al. ............ 438/3
5,831,797 A * 11/1998 Schaenzer et al. ....... 369/13.12
5,978,319 A * 11/1999 Wang et al. .............. 369/13.23
6,452,742 B1 * 9/2002 Crue et al. ................... 360/126
6,574,257 B1 * 6/2003 Thronton et al. ............. 372/46
2001/0055183 A1 * 12/2001 Cain et al. ................... 360/318

FOREIGN PATENT DOCUMENTS

JP 0492107 A * 7/1992

OTHER PUBLICATIONS

Chapman, A new approach to amking thin film head-slider device, Sep. 1989, IEEE Transaction on Magnetics, V. 25, No. 5, pp. 3686-3688.*
J. P. Lazzari et al., "A New Film Head Generation IC Head", IEEE Transactions on Magnetics, vol. 25, no. 5, Sep. 1989, pp. 3190-3193.

* cited by examiner

Primary Examiner—Tianjie Chen
(74) Attorney, Agent, or Firm—Michael E. Belk

(57) ABSTRACT

A simple method of manufacturing a magnetic head having a head face and including a planar magnetic coil (7) which extends parallel to the head face. According to the method, the magnetic coil is formed at a first side of a first substrate (1). Thereafter, the first substrate provided with the magnetic coil is adhered with its first side to a side of a second substrate, whereafter material of the first substrate is removed from a second side of the first substrate (9), the second side being turned away from the first side, in order to form the head face, in such a manner that the magnetic coil is situated near to the head face.

17 Claims, 5 Drawing Sheets

METHOD OF MANUFACTURING A MAGNETIC HEAD HAVING A PLANAR COIL

Figure 1:
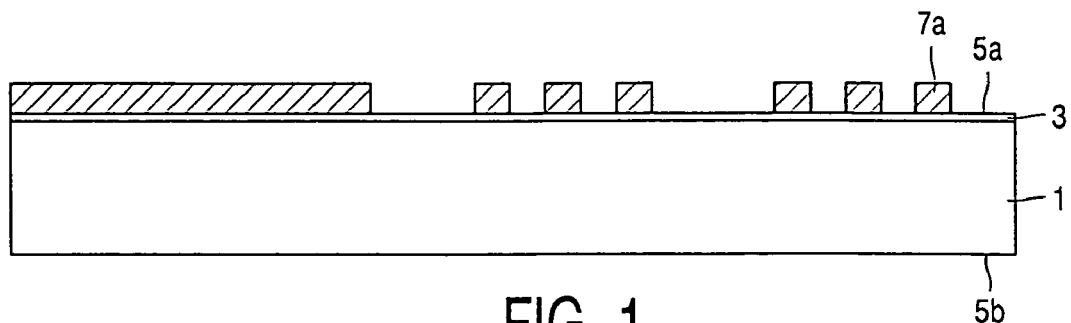
Figure 2:
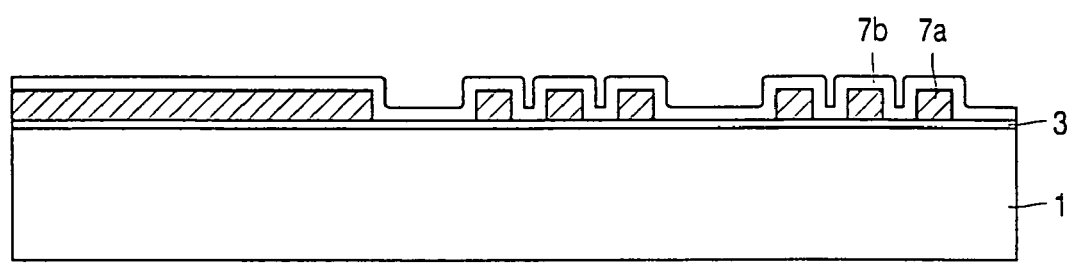
Figure 3:
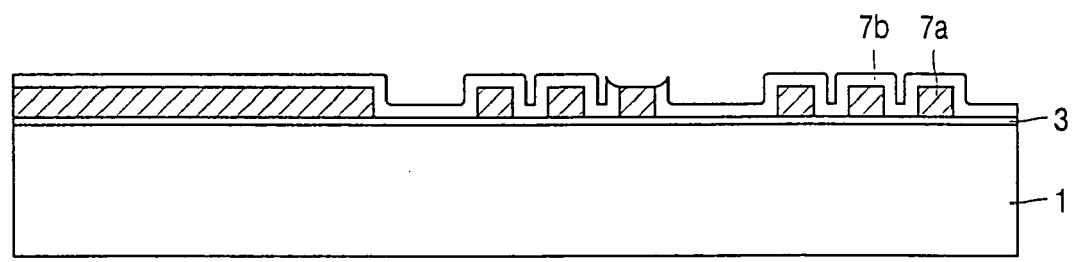
Figure 4:
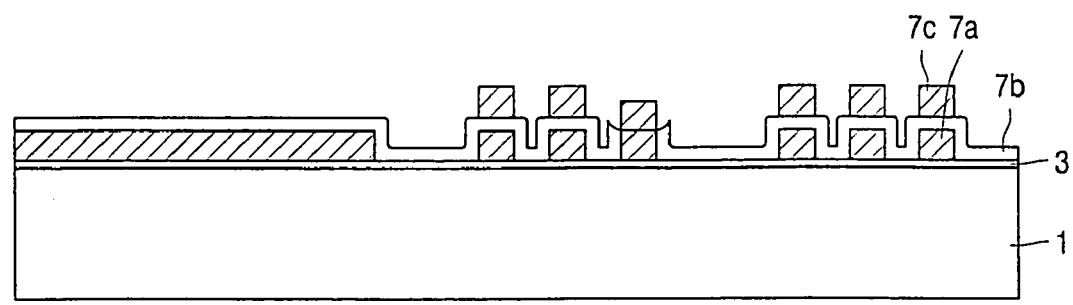
Figure 5:
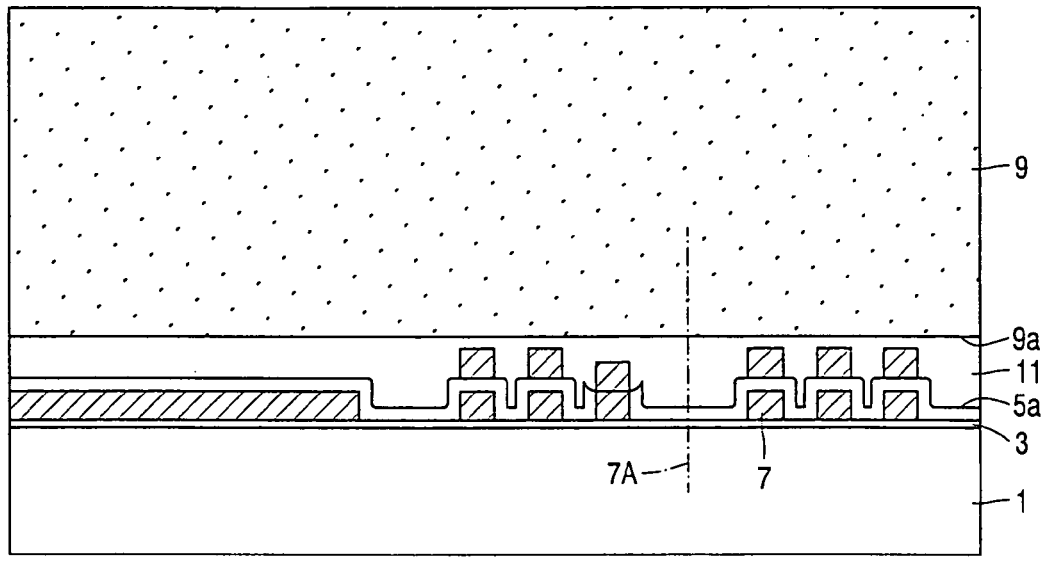
Figure 6:
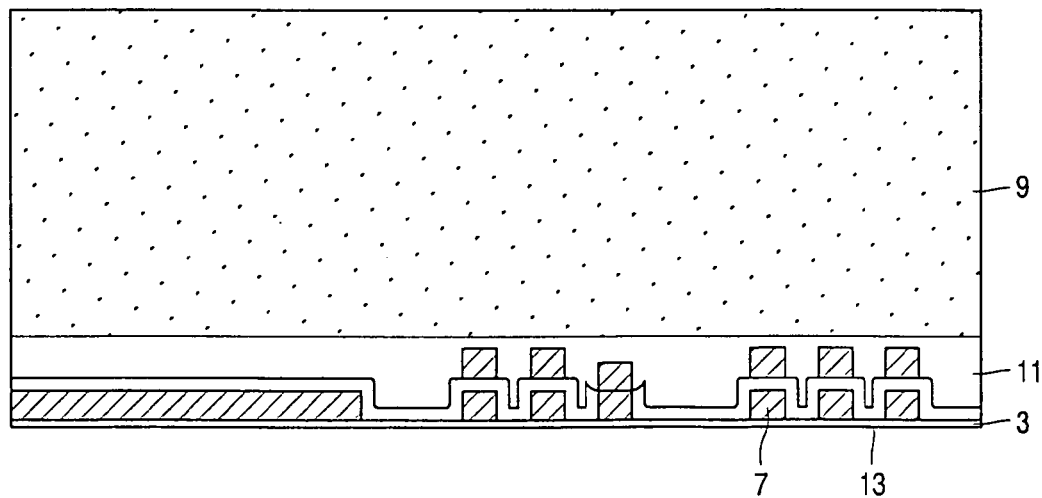
Figure 7:
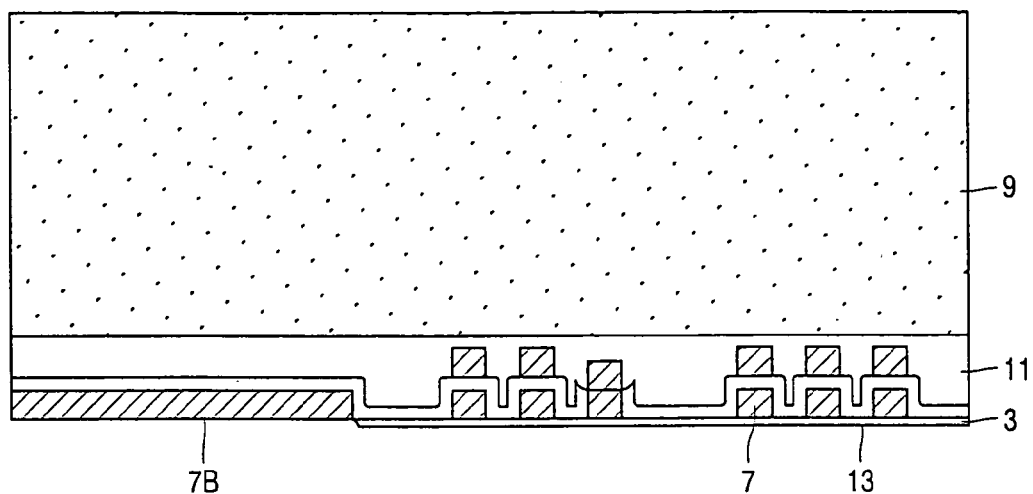

The invention relates to a method of manufacturing a magnetic head having a head face and including a magnetic coil which extends parallel to the head face.

Such a method is known from the paper IEEE Transactions on Magnetics, Vol. 25, No. 5, September 1989, pages 3190–3193. This paper describes a fabrication process for realizing thin film heads on silicon, called IC heads, for high-density magnetic recording. The fabrication process starts from a silicon wafer in which grooves are etched. In these grooves magnetic heads including conductor spirals are formed. At the end of the process air bearing surfaces are formed and sliders are defined by etching before the wafer is diced into separate components.

One way to realize high-density recording is to apply magneto-optical (MO) recording. In such a recording process data is written in a magnetic recording layer of a magnetic medium, e.g. a disk, by using a magnetic field for polarizing magnetic particles in the recording layer. Information can be read from such a layer by optically detecting the Kerr rotation of polarized light, which is reflected from the relevant layer. For most magnetic media a relatively strong magnetic field is required to achieve a complete polarization of the magnetic material due to the high coercivity of the medium. Heating up a magnetic medium reduces drastically the threshold value of the magnetic field intensity that is necessary for a complete polarization. Thermally assisted magnetic recording makes use of this phenomenon. In e.g. MO writing strategies with Laser Pulsed Magnetic Field Modulation (LP-MFM) a laser pulse is used to locally heat a magnetic medium while a magnetic field, which is synchronized with the timing of the laser pulse, polarizes the heated area. A magnetic head suitable for LP-MFM magneto-optical recording should have a magnetic-field-modulation (MFM) coil and usually has a transparent guide for guiding a laser beam. The laser beam can be used both for heating a magnetic medium and for reading data from the magnetic medium via the detection of the Kerr effect. Usually, the transparent guide is arranged to be coaxial with the coil. In order to achieve sufficiently high magnetic field intensities with limited power consumption the inner radius of the coil is as small as possible.

The size of the data bits which can be written by thermally assisted magnetic recording on a MO medium is limited by the size of the spot of the focussed laser beam and the thermal profile of the spot, and the thermal properties of the medium itself. The optical size of the spot depends on the wavelength ($\lambda$) of the laser light used and the numerical aperture (NA) of the optical path, yielding a diffraction limited spot with a radius (r) of the order of $0.61 \lambda/NA$. In near field recording a NA in excess of 1 is possible by using the evanescent waves, which occur at a surface of total internal reflection of a refractive optical component. A requirement is that the magnetic head, particularly the optical component thereof, is positioned with respect to the recording medium at a distance which is only a fraction of the wavelength of the laser light used. In order to realize higher recording densities in MO recording, such as near field recording, it is envisaged that the head to medium distance will be reduced towards the submicron range.

In a system for magnetic recording into a storage medium optical components are combined with a slider, the slider being carried by a suspension and being positioned below an objective lens of an actuator, an MFM coil being integrated in the slider. The slider is provided with an Air Bearing Surface (ABS) for flying on an air bearing at a surface of the storage medium during operation.

It is essential for such a slider that the coil of the magnetic head is a planar coil near to the plane of the ABS. In the method described in the previously mentioned IEEE paper this is realized by forming a ditch in a silicon wafer, whereafter a coil is buried in the ditch. A disadvantage of this known method is that making a ditch is laborious. Moreover, such a ditch is difficult to realize in most optical materials, such as multicomponent glasses, because these materials are in general difficult to etch. Since the coil structures are defined using photolithographic techniques, making a coil in a recess is a critical process because of the topography involved. In addition to this, an intermediate planarization between subsequent coil-layers is mechanically impossible.

It is an object of the invention to provide a simple method of manufacturing a magnetic head in which a planar coil is situated near to the head face.

This object is achieved by the method of manufacturing a magnetic head having a head face and including a magnetic coil which extends parallel to the head face, in which method the magnetic coil is formed at a first side of a first substrate, whereafter the first substrate provided with the magnetic coil is adhered, particularly glued, with its first side to a side of a second substrate, whereafter material of the first substrate is removed from a second side of the first substrate, which second side is turned away from the first side, to form the head face.

The method according to the invention involves only a few mask steps needed to realize a planar magnetic coil close to the head face. In the case of a magnetic head, intended for use in a slider the magnetic head may be integrated in the slider, the head face forming at least a part of an air bearing surface.

In an embodiment of the method according to the invention the first substrate may be a substrate of silicon provided with a top layer, e.g. an oxide, such as $SiO_2$ or $ZrO_4$ or a hard material, such as diamond, this top layer being adjacent to the first side of the first substrate. In general, the top layer forms the first side of the first substrate. The substrate of silicium may be a Si wafer. After adhering the first substrate to the second substrate at least a part of the silicon substrate is removed to form the head face. This can be effected by etching, preferably by means of a selective etching process which stops at the top layer, using e.g. hot KOH etchant, which is a selective etchant for Si and $SiO_2$.

In an embodiment of the method according to the invention, after a step involving the forming of a layer of a metal on the first substrate, at least one further step involving the forming of a layer of a non-conducting material and the forming of a further layer of a metal and the forming of interconnections between two neighboring layers of metal is performed to create the magnetic coil. The layers of metal can be formed by deposition, e.g. by means of electro deposition, of a suitable metal, such as Cu. The layer of a non-conducting material can be formed by depositing e.g. an oxide, such as $Al_2O_3$, or by spin coating of a polymer or in any other suitable way, such as spin-on-glass. The interconnection can be formed after holes have been formed in the layer of non-conducting material, e.g. by etching. The interconnection may also be formed by means of a lithographic process.

The non-conducting layer can be planarized by means of e.g. a polishing procedure, such as chemical-mechanical polishing, which improves the quality of the coil.

In an embodiment of the method according to the invention a substrate of a glass material is applied as the second substrate. This method results in a magnetic head having transparent portions. Such a head may be used as an MO-head and can have a light guide.

In an additional step the transparent guide can be made out of a material having a refractive index matched with that of the glass substrate in order to avoid optical problems like unwanted reflections on interfaces.

A further object of the invention is to provide a method of manufacturing a slider, in particular a slider applicable to a system for magneto-optical recording, the method enabling a magnetic coil, a defined air bearing surface and a defined location of the magnetic coil with respect to the air bearing surface to be realized in a limited number of method steps.

This further object is achieved by the method of manufacturing a slider having an air bearing surface and including a planar magnetic coil which extends parallel to the air bearing surface, in which method the magnetic coil is formed at a first side of a first substrate, whereafter the first substrate is adhered with its first side to a side of a second substrate, whereafter material of the first substrate is removed from a second side of the first substrate, which second side is turned away from the first side, in order to form a face, whereafter the face is structured to form the air bearing surface. Standard technology can be used to carry out the few steps of the method according to the invention. Removal of material of the first substrate and structuring of the said face is effected preferably by etching. Virtually, the formed magnetic coil is part of a magnetic head integrated in the obtained slider. Obviously, the magnetic coil has leads for electrical connections.

In an embodiment of the method of manufacturing a slider according to the invention on a silicon substrate a top layer of an insulating material is provided in order to form the first substrate, the top layer being adjacent to the first side, wherein a substrate of glass is applied as the second substrate, and wherein after adhering the first substrate to the second substrate the silicon substrate is removed. In general, the top layer forms the first side. The substrate of silicon can be a wafer of silicon. The top layer can be an oxide, such as $SiO_2$.

Since the top layer functions as a protective layer for the obtained slider, to preclude damage to the slider during use, e.g. owing to a crash with the surface of a recording medium or a bump into dust particles, a top layer of a hard material, such as a diamond-like coating or a layer or $ZrO_2$, is preferred. It is advantageous that the protective layer does not require any additional step, but is simply formed by the top layer of the first substrate.

An embodiment of the method of manufacturing a slider is characterized in that during forming of the magnetic coil a metallic layer is formed beside the magnetic coil, which metallic layer is at least partly removed to form a recess during structuring of the face for forming the air bearing surface. The metallic layer is preferably formed by deposition of the same metallic material as used for forming the magnetic coil, e.g. Cu. Removal of metallic material can be effected simply by etching, e.g. by using a standard Cu etchant. The depth of the desired recess can be tuned by the thickness of the metallic layer.

An embodiment of the method is characterized in that during forming of the magnetic coil a heat sink layer is formed beside the magnetic coil in the making. A suitable material for the heat sink layer is Cu, which can also be used as material for the magnetic coil. The heat sink layer is preferably positioned around or partly around the magnetic coil. The heat sink layer in the resulting slider serves to transfer heat from the magnetic coil to one or more edges of the slider, where air cooling and radiation can be very effective in order to cool the slider. If desired, a real thermal connection can be provided between the heat sink and a cooling body with an enlarged area, or an active coolant, like a Peltier element.

In another embodiment a stack of interconnected coil layers is formed to create the magnetic coil.

It should be noticed that the claimed method of manufacturing a slider has advantages and effects similar to those obtained by the claimed method of manufacturing a magnetic head.

The invention further relates to a slider manufactured by means of the method according to the invention. The slider according to the invention has a planar magnetic coil adjacent to an air bearing surface and is preferably locally transparent, in such a manner that a light beam can axially pass through a central area of the coil. The slider has preferably the feature as defined in claim 11.

Furthermore, the invention relates to a system for magnetically or magneto-optically recording information into a storage medium, the system including the slider according to the invention.

With reference to the claims, it is to be noted that various characteristic features as defined in the set of claims may occur in combination.

The above-mentioned and other aspects of the invention are apparent from and will be elucidated, by way of non-limitative example, with reference to the embodiments described hereinafter.

Figure 8:
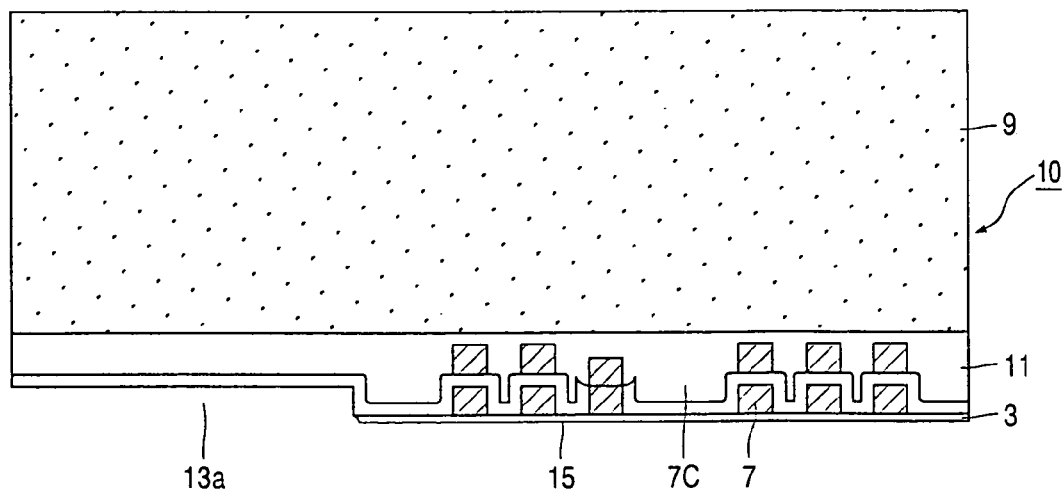
Figure 9A:
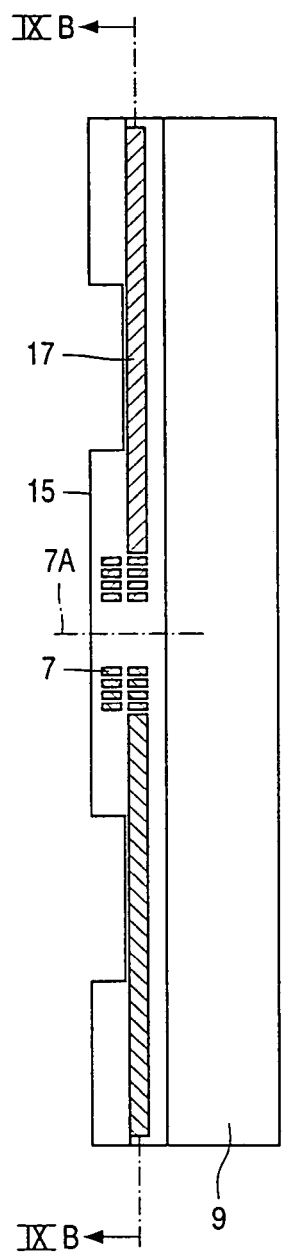
Figure 9B:
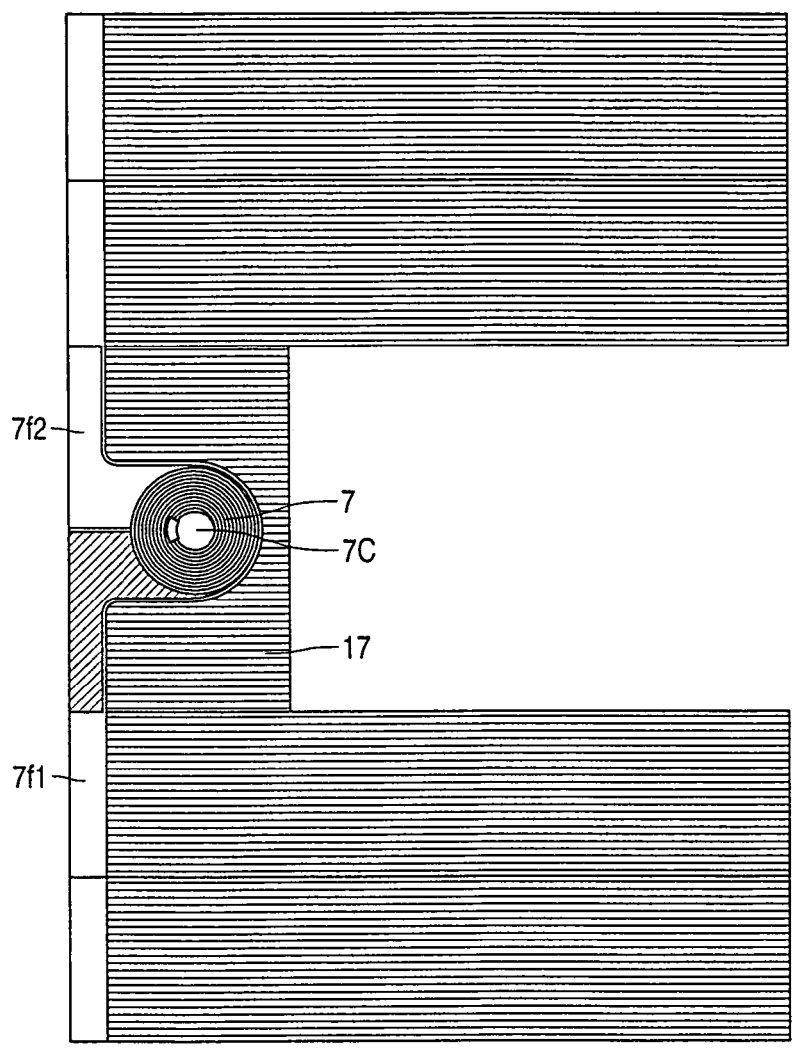
Figure 10:
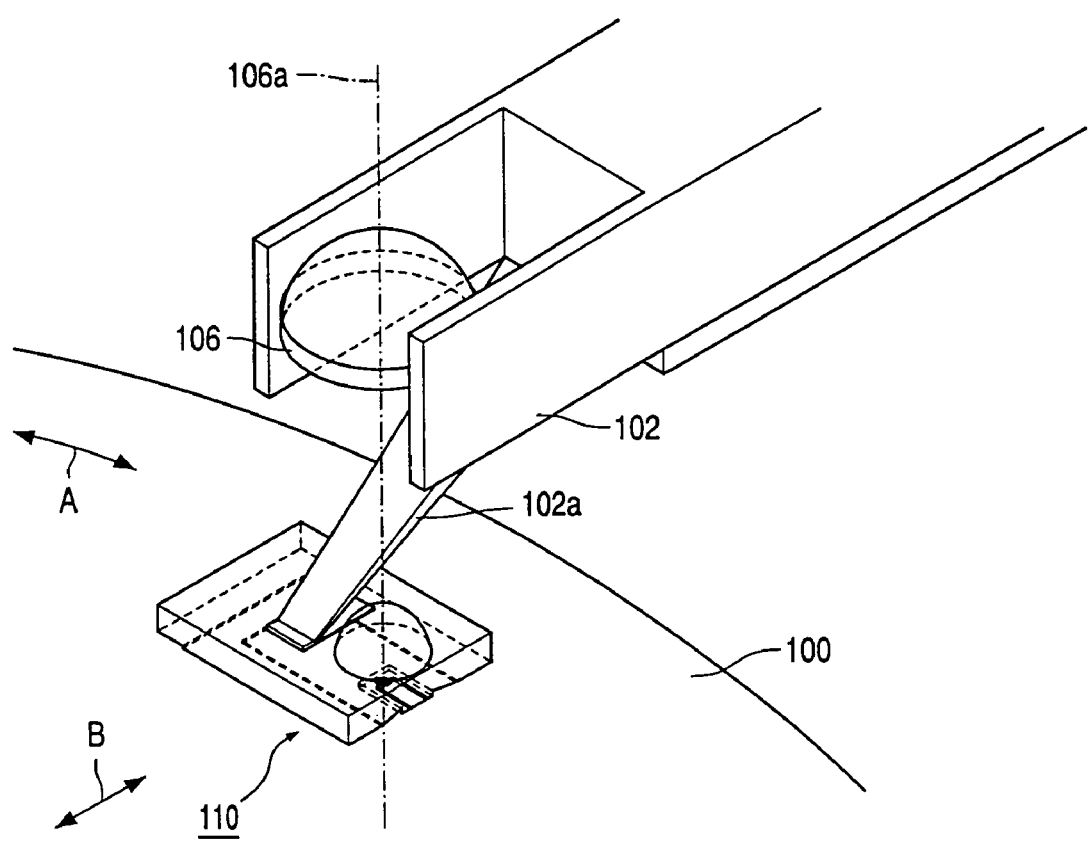

In the drawings:

FIGS. 1 to 8 represent diagrammatically various steps of an embodiment of a method according to the invention, in which FIG. 8 also shows a first embodiment of the slider according to the invention, FIG. 9A shows diagrammatically in a cross sectional view a second embodiment of the slider according to an invention, FIG. 9B shows the second embodiment in a sectional view taken on the line IXB—IXB in FIG. 9A, and FIG. 10 shows diagrammatically in a perspective view an embodiment of a system according to the invention.

An embodiment of the method according to the invention of manufacturing a slider 10 will now be described with reference to FIGS. 1 to 8. This embodiment starts from a substrate 1 of silicon which substrate 1 may form part of a Si-wafer. An insulation material, particularly an oxide such as $SiO_2$ or $Al_2O_3$ is deposited on a main face of the substrate 1, for example, by thermal oxidation, by means of sputtering or by vapor deposition, to form a thin top layer 3 having a thickness of e.g. 0.5 μm. The substrate 1 and the top layer 3 together form a first substrate having a first side 5a and a second side 5b parallel to the first side 5a. A first conductive or metallic layer 7a provided with one or more coil turn sections is formed at the first side 5a of the first substrate, for example, by means of sputter deposition or electro deposition of copper or another suitable electrically conductive material. Then a nonconducting layer 7b is formed on the first conductive layer 7a by e.g. deposition of $S_iO_2$ or $Al_2O_3$, or by spin-coating of a polymer. Thereafter, a second conductive layer 7c is formed on the insulating layer 7b and an interconnection between the first and second conductive layers is made, e.g. by locally etching the non-conducting layer 7b before the second conductive layer 7c is formed.

The layers 7a, 7b and 7c together form a planar magnetic coil 7 having a coil axis 7A. It is to be noted that in another embodiment the coil 7 may have only one conductive layer. After forming the coil 7 the first substrate is adhered, particularly glued, with its first side 5*a*, which side has been shifted in this embodiment owing to technology steps, to a side 9*a* of a second substrate 9 of e.g. glass. The second substrate 9 may form part of a glass wafer. A suitable glue is e.g. acrylate resin varnish; 1,6-hexanediodiacrylate. In a following step the substrate 1 is removed, particularly etched away, in e.g. hot KOH, resulting in a face 13. Subsequently, the face 13 is structured by first locally removing the top layer 13, e.g. by locally etching away insulation material, and then locally removing material of one or more laid open portions 7B of the first conductive layer 7*a*, e.g. by locally etching, in order to create an air bearing surface 15, which is the face 13 provided with one or more recessed portions 13*a*. In the case that Cu is used as the conductive material for the coil 7 a standard Cu etchant may be used to form the air bearing surface 15. The depth of the recessed portion or portions 13*a* can be tuned by using multiple metallic layers.

During use of the slider the air bearing surface 15 of the slider obtained by the above described method serves to control the flow of air produced between a surface of a moving storage medium and the slider 10 located adjacent said surface, in order to avoid contact of the slider with the storage medium.

It is to be noticed that the above-described method can also be used for manufacturing a magnetic head. In that case the method steps as shown in the FIGS. 7 and 8 can be omitted. This means that the product shown in FIG. 6 may be a magnetic head, the face 13 forming a head face. Both in the case of the slider and in the case of the magnetic head the top layer may function as a protective layer.

It is to be noted further that the slider as shown in FIG. 8 has a transparent coil center 7C and is transparent along the coil axis 7A by a suitable choice of transparent materials, as a result of which the slider is transparent to a beam of light going through said center.

In a variant of the above-described embodiment a heat sink layer is formed during forming of the coil 7. FIGS. 9A and 9B show an embodiment of the slider according to the invention provided with a heat sink 17. Elements of this variant which correspond to similar elements of the embodiment already described have the same reference signs. In the relevant variant the heat sink is formed simultaneously with the coil 7 by means of deposition of the same metal as deposited for forming the magnetic coil 7 and its connection faces $7f_1$, and $7f_2$. The heat sink 17 is positioned adjacent to, i.e. at least partly around and/or above or beneath, the magnetic coil 7, and serves to transfer heat from the turn or turns of the coil to the borders of the slider, where convection and radiation effectively cool the slider during its use. In a special embodiment a thermal connection may be provided between the heat sink and a cooling body with an enlarged area, or an active coolant, like a Peltier element.

An embodiment of the system according to the invention, shown in FIG. 10, is suitable for writing and/or reading a magneto-optical information disk 100. The disk 100 is rotably supported by an electrically drivable spindle mounted in a base. During use the disk 100 is rotated in a direction of rotation, indicated by the arrow A. The system includes an arm 102 translatably held on the base and having a flexural member 102*a* carrying an embodiment of the slider according to the invention, here indicated by the numeral 110, having a transparent body indicated by the numeral 104. An electrical drive is provided to translate the arm 102, the slider 110 being moved in radial directions, indicated by the arrow B, during translation over the disk 100. During writing and/or reading the air-bearing surface of the slider is located opposite to and at a distance from a main face of the disk 100. The arm 102 carries a lens section 106 having an optical axis 106*a* going through the transparent center of the magnetic coil of the slider 110. Here, the coil is indicated by the numeral 107.

The system according to the invention can be a data storage system. Alternatively, the system may be an audio and/or video system. A rotatable arm may be used instead of a translatable arm.

The invention claimed is:

1. A method of manufacturing a magnetic head having a head face and including a magnetic coil which extends parallel to the head face, in which method the magnetic coil is formed on a top layer at a first side of a first substrate, whereafter the first substrate provided with the magnetic coil is adhered with its first side to a side of a second substrate, whereafter material of the first substrate is removed from a second side of the first substrate to expose at least a portion of the top layer, which second side is turned away from the first side, to form the head face, wherein a substrate of silicon provided with the top layer of an insulating material is used as the first substrate, the top layer being adjacent to the first side.

2. A method as claimed in claim 1, wherein after a step involving the forming of a layer of a metal on the first substrate, at least one further step involving the forming of a layer of a non-conducting material and the forming of a further layer of a metal and the forming of interconnections between two neighboring layers of metal is performed to create the magnetic coil.

3. A method as claimed in claim 1, wherein a substrate of a glass material is used as the second substrate.

4. A method of manufacturing a slider having an air bearing surface and including a planar magnetic coil which extends parallel to the air bearing surface, in which method the magnetic coil is formed on a top layer at a first side of a first substrate, whereafter the first substrate is adhered with its first side to a side of a second substrate, whereafter material of the first substrate is removed from a second side of the first substrate until the top layer is at least partially exposed, which second side is turned away from the first side, in order to form a face, whereafter this face is structured to form the air bearing surface, wherein during forming of the magnetic coil a metallic layer is formed beside the magnetic coil, which metallic layer is at least partly removed to form a access during structuring of the face to form the air bearing surface.

5. A method as claimed in claim 4, wherein on a silicon substrate the top layer of an insulation material is provided in order to form the first substrate, the top layer being adjacent to the first side, wherein a substrate of glass is used as the second substrate, and wherein the silicon substrate is removed after adhering of the first substrate to the second substrate.

6. A method as claimed in claim 4, wherein during forming of the magnetic coil a heat sink layer is formed beside the magnetic coil in the making.

7. A method as claimed in claim 4, wherein a stack of interconnected coil layers is formed to create the magnetic coil.

8. A slider manufactured by the method as claimed in claim 4.

9. A slider as claimed in claim 8, wherein the top layer forms a protective layer for the slider.

10. A system for magnetically or magneto-optically recording information into a storage medium, the system including the slider as claimed in claim 8.

11. A method of manufacturing a slider having an air bearing surface with a magnetic coil near the air bearing surface comprising the steps of:
   forming the slider and the magnetic coil on a top layer at a first side of a first substrate;
   adhering the first side of the first substrate to a side of a second substrate;
   removing material from a second side of the first substrate, wherein the second side is turned away from the first side, until features of at least a portion of the top layer is exposed thereby forming a face, wherein during forming of the magnetic coil a metallic layer is formed beside the magnetic coil, which metallic layer is at least partly removed to form a recess during structuring of the face to form an air bearing surface.

12. A method as claimed in claim 11, wherein the step of forming further comprises forming on a silicon substrate the top layer of an insulation material is provided in order to farm the first substrate, the top layer being adjacent to the first side, wherein a substrate of glass is used as the second substrate, and wherein the silicon substrate is removed by the step of removing after adhering of the first substrate to the second substrate.

13. A slider manufactured by the method as claimed in claim 12.

14. A slider as claimed in claim 13, wherein the top layer forms a protective layer for the slider.

15. A system for magnetically or magneto-optically recording information into a storage medium, the system including the slider as claimed in claim 14.

16. A method as claimed in claim 11, wherein during forming of the magnetic coil a heat sink layer is formed beside the magnetic coil.

17. A method as claimed in claim 11, wherein a stack of interconnected coil layers is formed to create the magnetic coil.

* * * * *